3,065,186
PROCESS FOR THE PRODUCTION OF HEAT RESISTANT HARDENED EPOXIDE RESINS
Manfred Budnowski, Dusseldorf-Holthausen, and Edgar Lieske and Manfred Dohr, Dusseldorf, Germany, assignors to Henkel & Cie. G.m.b.H., Dusseldorf-Holthausen, Germany, a corporation of Germany
No Drawing. Filed July 7, 1960, Ser. No. 41,263
8 Claims. (Cl. 260—2)

It is known that hardenable compounds containing epoxide groups may be used in admixtures with suitable acidic or basic hardeners to produce hardened objects of epoxide resins such as castings, moldings, laminated materials, coating and adhesive bonds. In many cases products with excellent strength are obtained thereby. A particular advantage of the epoxide resins resides in that materials of different types, such as metals, can be adhesively joined with each other or with other materials by use of these epoxide resins. However, a disadvantage of the epoxide resins is that the strength of their adhesive bond as well as resistance to stress is substantially reduced at temperatures above 150° C.

An object of the present invention is the development of hardened epoxide resins which retain the strength of their adhesive bond and resistance to stress at temperatures above 150° C. and even to beyond temperatures of 250° C.

A further object of the present invention is the production of hardened glycide esters of $\alpha,\alpha'$-[9,10-dihydroanthrylene-(9,10)]-succinic acid containing more than one epoxide group in the molecule.

A still further object of the invention is the development of a process for the production of hardened epoxide resins which retain the strength of their adhesive bond and resistance to stress at temperatures above 150° C. by hardening glycide esters of $\alpha,\alpha'$-[9,10-dihydroanthrylene-(9,10)]-succinic acid containing more than one epoxide group in the molecule with the conventional high-temperature polyfunctional hardeners.

These and other objects of the invention will become more apparent as the description proceeds.

We have found that hardened objects, such as castings, molding, laminated objects, coatings and adhesive bonds having a substantially improved heat resistance can be obtained with the aid of certain types of epoxide resins. In accordance with the present invention glycide ester-like derivatives of $\alpha,\alpha'$-[9,10-dihydro-anthrylene-(9,10)]-succinic acid (sometimes called endo-anthracene succinic acid and hereinafter referred to as anthracene-succinic acid) containing more than one epoxide group in the molecule are used in admixture with customary high temperature polyfunctional hardeners for the production of hardened objects. The mixture of hardener and epoxide compound is hardened at elevated temperatures in accordance with known methods.

Anthracene-succinic acid anhydride is obtained by reaction of 1 mol anthracene with 1 mol maleic acid anhydride (see Beilstein "Handbook of Organic Chemistry," second supplement, vol. 17, 1952, page 511). This anhydride or the free acid derived therefrom as well as its salts or derivatives may be used as starting materials for the epoxide resins employed in accordance with the invention.

The production of the glycide ester-like derivatives of anthracene-succinic acid containing more than one epoxide group in the molecule may be accomplished by various methods. For example, the free anthracene-succinic acid may be reacted with a lower halogen-epoxy-alkane containing a halogen atom vicinal to the epoxide group, preferably with epichlorohydrin, and subsequently the chlorohydrin ester obtained thereby may be transformed into the epoxide compounds by means of an alkali metal hydroxide. Further, the anthracene-succinic acid may be reacted with an excess of a lower halogen-epoxy-alkane containing a halogen atom vicinal to the epoxide group, advantageously using ion exchangers as catalysts or the anhydride of anthracene-succinic acid and a suitable initiator may be reacted with an excess of a lower halogen-epoxy-alkane containing a halogen atom vicinal to the epoxide group using the same ion exchanger catalyst, in accordance with the process described in U.S. patent application Serial No. 10,029 filed February 23, 1960, commonly assigned. It is also possible to produce the glycide ester-like derivatives used in accordance with the present invention by reacting a salt, preferably an alkali metal salt, of anthracene-succinic acid with a lower halogen-epoxy-alkane containing a halogen atom vicinal to the epoxide group at elevated temperatures in known fashion, or by reacting a halide of this acid with a lower epoxy alkanol such as glycide in the presence of acid-binding materials.

In accordance with the present invention, the glycide ester-like derivatives produced by one of the above mentioned or any other desired process is used in admixture with known high temperature hardeners such as those which are customarily used for hardening epoxide resins at elevated temperatures. Such hardeners are, for example, acidic or basic polyfunctional compounds.

Examples of acidic hardeners are di- or polycarboxylic acids or their anhydrides such as the carbo-aliphatic compounds, succinic acid and anhydride, alkyl succinic acids and anhydrides, dichlorosuccinic acid and anhydride, adipic acid, maleic acid and anhydride, dichloromaleic acid and anhydride, and the carbocyclic compounds, phthalic acid and anhydride, endomethylene-tetrahydrophthalic acid and anhydride, methyl-endo-methylene-tetrahydrophthalic acid and anhydirde, hexachloro-endomethylene-tetrahydrophthalic acid and anhydride, anthracene-succinic acid and anhydride, pyromellitic acid and anhydrides, or polyesters with at least two free carboxyl groups such as the ester formed from 1 mol of ethylene glycol and 2 mols of phthalic acid.

Other suitable high temperature hardeners are the basic aromatic amines which contain at least two primary or secondary amino groups, such as o-, m-, or p- phenylene diamine, benzidine, 4,4'-diaminodiphenyl-methane, 4,4'-diaminodiphenyl sulfone. Other high temperature hardeners are also suitable for the process according to the invention, such as carboxylic acid amides or sulfonic acid amides, especially those which contain more than one carbonamide or sulfonamide group in the molecule, as well as dicyandiamide or low molecular phenol-formaldehyde condensation products.

The list of known so-called high temperature hardeners which are suitable for use in the process according to the invention is by no means complete. A detailed summary of such hardeners may be found in the book by A. M. Paquin entitled "Epoxy Compounds and Epoxy Resins." The amount of hardener may vary within wide limits and preferably it should be present in amounts of 10 to 70% of the mixture.

Depending upon the type and amount of hardeners employed, the hardening temperature varies and in general lies between 80 and 250° C. The duration of the hardening depends upon the temperature and upon the hardener employed. In some cases hardening at high temperatures for only a few minutes is sufficient, while in other cases a hardening period of several hours, sometimes up to about 20 hours, is required.

The mixture of glycide ester-like derivatives of anthracene-succinic acid and hardener may further be modified with known fillers, such as pulverized stone, quartz powder, clay, cement, chalk, graphite, kieselguhr, asbestos, as well as oxides of metals, such as aluminum, zinc, lead, manganese and titanium or metal powders, such as aluminum powder, iron powder, copper powder or bronze powder as well as glass fibers, powdered phenol resin and the like. With the aid of these additives the heat resistance of the hardened resin is in some cases still further increased.

For the production of coatings, mixtures of hardener and glycide ester-like derivatives of anthracene-succinic acid may also be used in conjunction with volatile solvents.

The following examples will further illustrate the present invention and enable others skilled in the art to understand the invention more completely. It is to be understood, however, that the following examples are not to be construed as limitations on the practice of the invention.

*Example 1*

294 gms. of anthracene-succinic acid (produced by adduct formation from anthracene and maleic acid anhydride in a molar ratio of 1:1 with subsequent saponification) were refluxed for 12 hours with 120 gms. of a commercial, water-containing anion exchanger resin ("Dowex 1X10") and 3700 gms. of epichlorohydrin. After cooling, the reaction mixture was separated from the catalyst by filtration. Subsequently, the excess epichlorohydrin was distilled off at a pressure of 40 mm. Hg. Finally, residual epichlorohydrin and dichlorohydrin formed during the reaction were distilled off under a pressure of 0.5 mm. Hg until the internal temperature of the reaction mixture reached 120° C. 280 gms. of an epoxide resin were obtained which had the following characteristic values:

|  | Percent |
|---|---|
| Epoxide oxygen content | 3.7 |
| Chlorine | 6.9 |
| Color according to Lovibond (1" dish): 2.0 yellow, 0.6 red (diluted with acetone in a ratio of 1:1). | |

The example described above was repeated. In working up the reaction mixture, only a major amount of the epichlorohydrin was distilled off. Thereafter, the mixture was allowed to stand. Upon cooling of the mixture, a white, solid product crystallized out which had the following characteristic values after filtration and washing with gasoline:

| Epoxide oxygen content, percent | 6.5 |
|---|---|
| Chlorine, percent | 1.4 |
| Melting point, ° C. | 170 to 180 |

In admixture with a solid heat hardener such as phthalic acid anhydride, this powder has a shelf life of more than 4 months.

The anion exchanger resin used in this example was the commercial product "Dowex 1X10." On information supplied by manufacturer, this product is a strongly basic anion exchanger with a polystyrene base which contains quaternary benzylammonium groups. The resin was treated with water before using. This anion exchanger resin was used with equal success either in the form of the free base or the form of the hydrochloric acid salt.

*Example 2*

276 gms. of anthracene-succinic anhydride (produced by adduct formation from anthracene and maleic acid anhydride in a molar ratio of 1:1) were refluxed for 8 hours with 3.7 kg. of epichlorohydrin containing about 1% water and 200 gms. of a water-containing commercial anion exchanger resin ("Dowex 1X10" in the form of the hydrochloric acid salt). After cooling, the reaction mixture was separated from the catalyst by filtration. Thereafter, the excess epichlorohydrin was distilled off at a pressure of 40 mm. Hg. Finally, the residual volatile components were distilled off at a pressure of about 0.5 mm. Hg until the temperature in the reaction mixture reached 120° C. The residue consisted of 380 gms. of an epoxide resin having the following characteristic values:

|  | Percent |
|---|---|
| Epoxide oxygen content | 4.6 |
| Chlorine | 4.4 |

The above example was repeated. In working up the reaction mixture, only a major amount of the epichlorohydrin was distilled off. Thereafter, the mixture was allowed to stand. Upon cooling of the mixture, a white solid product crystallized out which had the following characteristic values after filtration and washing with gasoline:

| Epoxide oxygen content, percent | 6.5 |
|---|---|
| Chlorine content, percent | 1.4 |
| Melting point, ° C. | 170 to 180 |

In admixture with a solid heat hardener, such as phthalic acid anhydride, this powder had a shelf life of more than 4 months.

*Example 3*

The resin-like glycide ester prepared according to Example 1 was used to make the following adhesive mixture. A mixture of phthalic acid anhydride and tetrahydrophthalic acid anhydride in a weight ratio of 3:1 was used as a hardener. The glycide ester was admixed with this hardener in a weight ratio of 10:3. With the aid of this mixture several pairs of hard aluminum strips having a dimension of 100 x 20 x 2 mm. were adhesively bonded with an overlap of 10 mm. The bonded test strips were hardened for 16 hours at 140° C. Subsequently, some of the adhesively bonded test strips were examined for their shear resistance at various temperatures. The following values were obtained:

| Temperature, ° C | 25 | 100 | 150 | 200 | 250 | 300 |
|---|---|---|---|---|---|---|
| Shear strength in kg./mm.² | 1.2 | 1.5 | 1.8 | 2.2 | 2.3 | 0.2 |

The remainder of the test strips were stored for 64 hours at 200° C. Subsequently their shear strength was again determined at various temperatures. The following values were obtained:

| Temperature, ° C | 25 | 100 | 150 | 200 | 250 | 300 |
|---|---|---|---|---|---|---|
| Shear strength in kg./mm.² | 2.3 | 2.5 | 2.4 | 2.3 | 2.4 | 0.3 |

This high temperature-resistant adhesive bond produced from the adhesive composition of a glycide ester-like derivative of anthracene-succinic acid containing more than one epoxide group in the molecule and a high temperature hardener can be directly compared to the adhesive bond produced by the conventional adhesive composition of the conventional glycide ester-like derivative of a polycarboxylic acid and the same high temperature hardener in the following example.

*Example 4*

166 gms. of o-phthalic acid were refluxed for 5 hours with 80 gms. of a commercial anion exchanger resin ("Dowex 1X10," in the form of the hydrochloride salt) which was swollen with water and 3700 gms. of epichlorohydrin containing 1% water. The reaction mixture was processed according to Example 1. 300 gms. of a glycide phthalic acid resin were obtained having an epoxide oxygen content of 7.3%, a chlorine content of 6.0%, a viscosity at 50° C. of 300 cp. and a color according to Lovibond (1" dish) of 1.4 yellow, 0.5 red.

Strips of hard aluminum having a length of 100 mm., a width of 20 mm. and a thickness of 2 mm. were adhesively joined without pressure with a simple overlap of 10 mm. with the aid of an adhesive mixture consisting of 80 gms. of the reaction product obtained above in the presence of 1% water, 30 gms. of phthalic acid anhydride and 10 gms. of tetrahydrophthalic acid anhydride. The test strips were hardened for 14 hours at 140° C. The shear strength values were obtained. Comparison between the shear strength values at various temperatures is indicated in the following table:

| Temperature, °C. | Shear strength in kg./mm.² glycide-phthalate resin | Glycide-anthracene-succinate resin |
|---|---|---|
| 25 | 2.7 | 1.2 |
| 100 | 4.0 | 1.5 |
| 150 | 2.1 | 1.8 |
| 200 | 0.8 | 2.2 |
| 250 | 0.0 | 2.3 |
| 300 | 0.0 | 0.2 |

*Example 5*

10 gms. of the crystallized epoxide compound described in Example 2 were intimately admixed with 5 gms. of the hardener, described in Example 3. Hard aluminum strips were adhesively bonded with this composition and the adhesive was hardened under the same conditions as described in Example 3. Thereafter, the shear strength of the bond was again determined at varying temperatures. The following values were obtained:

| Temperature, °C | 25 | 100 | 150 | 200 | 250 | 300 |
|---|---|---|---|---|---|---|
| Shear strength in kg./mm.² | 2.1 | 2.4 | 2.6 | 2.75 | 1.8 | 1.1 |

*Example 6*

10 gm. of the crystallized epoxide compound used in Example 5 were admixed with 5 gm. methyl-endomethylene-tetrahydrophthalic acid anhydride. Hard aluminum strips having a dimension of 100x20x2 mm. were adhesively bonded with this mixture, the overlapping amounting to 10 mm. These test samples were hardened for 16 hours at 150° C. Thereafter, the shear strength was again determined at varying temperatures. The following values were obtained:

| Temperature, °C | 25 | 100 | 150 | 200 | 250 | 300 |
|---|---|---|---|---|---|---|
| Shear strength in kg./mm.² | 1.8 | 2.2 | 2.3 | 2.15 | 2.0 | 0.7 |

*Example 7*

10 gm. of the crystallized epoxide compound used in Example 5 were admixed with 4 gm. maleic acid anhydride. Hard aluminum strips having a dimension of 100x20x2 mm. were adhesively bonded with this mixture, the overlapping being 10 mm. The test samples were hardened for 16 hours at 140° C. Thereafter, the shear strength was determined at varying temperatures. The following values were obtained:

| Temperature, °C | 25 | 100 | 150 | 200 | 250 | 300 |
|---|---|---|---|---|---|---|
| Shear strength in kg./mm.² | 2.25 | 2.2 | 2.7 | 2.6 | 2.0 | 1.3 |

*Example 8*

Example 7 was repeated, but 8 gm. of endomethylene-tetrahydrophthalic acid anhydride were used as the hardener. The test of the shear strength resulted in the following values:

| Temprature, °C | 25 | 100 | 150 | 200 | 250 | 300 |
|---|---|---|---|---|---|---|
| Shear strength in kg./mm.² | 3.2 | 3.3 | 3.2 | 3.1 | 2.4 | 0.8 |

*Example 9*

Example 7 was repated, but 8 gm. of the product produced from β-naphthol and maleic acid anhydride (see Chemical Abstracts, 1952, 8073f) was used as a hardener. Testing of the shear strength resulted in the following values:

| Temperature, °C | 25 | 100 | 150 | 200 | 250 | 300 |
|---|---|---|---|---|---|---|
| Shear strength in kg./mm.² | 1.8 | 2.2 | 2.4 | 2.35 | 2.3 | 1.75 |

*Example 10*

Example 7 was repeated, but 3 gm. of methylene-bis-aniline-(4,4'-diamino-diphenyl-methane) were used as a hardener. The shear strength measurement resulted in the following values:

| Temperature, °C | 100 | 200 | 300 |
|---|---|---|---|
| Shear strength in kg./mm.² | 1.1 | 1.4 | 1.3 |

Examples 11 and 12 illustrate that the shear strength of the resin of the invention is very good even after prolonged exposure to high temperatures.

*Example 11*

The test samples prepared under the same conditions as described in Example 5 were exposed to a continuous temperature of 200° C. From time to time the shear strength of the adhesive bond was measured at elevated temperatures. The following values were obtained:

| In days | Kg./mm.² | |
|---|---|---|
|  | 100° C. | 200° C. |
| 1/4 | 1.8 | 2.3 |
| 1 | 2.2 | 2.7 |
| 2 | 2.2 | 2.5 |
| 7 | 1.8 | 1.8 |
| 14 | 1.6 | 1.8 |

*Example 12*

Example 11 was repeated, but the test samples were continuously exposed to a temperature of 250° C. The shear strength at elevated temperatures, measured at various time intervals, resulted in the following values:

| In days | Kg./mm.² | |
|---|---|---|
|  | 100° C. | 250° C. |
| 1/2 | 1.75 | 2.75 |
| 1 | 2.7 | 2.75 |
| 3 | 2.4 | 2.4 |

The preceding examples are illustrative of the process of the invention and the adhesive composition. It is readily apparent to one skilled in the art that various changes and modifications can be made without departing from the spirit of the invention or the scope of the appended claims.

We claim:

1. A composition which upon hardening becomes a heat resistant synthetic resin comprising a hardenable glycide ester of α,α'-[9,10-dihydro-anthrylene-(9,10)]-succinic acid containing more than one epoxide group in the molecule and from about 10% to about 70% of the weight of the composition of a high-temperature polyfunctional hardener.

2. A composition which upon hardening becomes a heat resistant synthetic resin comprising about 30% to about 90% of a hardenable ester of glycide and α,α'-[9,10-dihydro-anthrylene-(9,10)]-succinic acid, said ester containing more than one epoxide group in the molecule and about 10% to about 70% of a high-temperature hardener selected from the group consisting of dicarboxylic acids and their anhydrides.

3. A composition which upon hardening becomes a heat resistant synthetic resin comprising about 30% to about 90% of a hardenable ester of glycide and α,α'-

[9,10-dihydro-anthrylene-(9,10)]-succinic acid, said ester containing more than one epoxide group in the molecule and about 10% to about 70% of a high-temperature hardener selected from the group consisting of carbocyclic dicarboxylic acids and their anhydrides.

4. A composition which upon hardening becomes a heat resistant synthetic resin comprising about 30% to about 90% of a hardenable ester of glycide and $\alpha,\alpha'$-[9,10-dihydro-anthrylene-(9,10)]-succinic acid, said ester containing more than one epoxide group in the molecule and about 10% to about 70% of a high-temperature hardener selected from the group consisting of aliphatic dicarboxylic acids and their anhydrides.

5. A composition which upon hardening becomes a heat resistant synthetic resin comprising about 30% to about 90% of a hardenable ester of glycide and $\alpha,\alpha'$-[9,10-dihydro-anthrylene-(9,10)]-succinic acid, said ester containing more than one epoxide group in the molecule and about 10% to about 70% of a polyvalent aromatic amine as a high-temperature hardener.

6. The process of producing heat-resistant hardened epoxy resins which comprises the steps of mixing together a hardenable glycide ester of $\alpha,\alpha'$-[9,10-dihydro-anthrylene-(9,10)]-succinic acid containing more than one epoxide group in the molecule and from about 10% to about 70% of the weight of the composition of a high-temperature polyfunctional hardener, and heating the composition to a temperature between about 80° C. and 250° C. for a time sufficient to produce a hardened epoxy resin.

7. The process of producing heat-resistant hardened epoxy resins which comprises the steps of mixing together about 30% to about 90% of a hardenable ester of glycide and $\alpha,\alpha'$ - [9,10-dihydro-anthrylene-(9,10] - succinic acid, said ester containing more than one epoxide group in the molecule and about 10% to about 70% of a high-temperature hardener selected from the group consisting of dicarboxylic acids and their anhydrides and heating the composition to a temperature between about 80° C. and 250° C. for a time sufficient to produce a hardened epoxy resin.

8. A heat-resistant hardened epoxy resin produced by the process of claim 6.

References Cited in the file of this patent

UNITED STATES PATENTS

| 2,895,947 | Shokal et al. | July 21, 1959 |
| 2,966,479 | Fischer | Dec. 27, 1960 |

FOREIGN PATENTS

| 844,968 | Germany | July 28, 1952 |